UNITED STATES PATENT OFFICE.

HERMANN FRIEDMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

YELLOW VAT DYE.

1,034,896. Specification of Letters Patent. Patented Aug. 6, 1912.

No Drawing. Application filed December 9, 1911. Serial No. 664,857.

*To all whom it may concern:*

Be it known that I, HERMANN FRIEDMANN, doctor of philosophy, chemist, citizen of the German Empire, residing at Elberfeld, Germany, have invented new and useful Improvements in Yellow Vat Dye, of which the following is a specification.

The present application concerns the manufacture and production of new vat dyes of the anthracene series having most probably the formula:

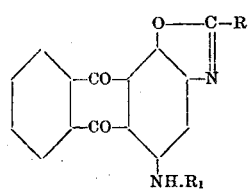

(R meaning a substituent such a methyl, ethyl, phenyl, tolyl, xylyl, chlorophenyl, methoxyphenyl and $R_1$ meaning an acyl such as benzoyl, acetyl, methoxybenzoyl).

The new dyes can be obtained by acylizing the dyestuffs described in my application Serial No. 664,858 filed the same date by means of acylizing agents such as acetyl chlorid, benzoyl chlorid, methoxybenzoyl chlorid. They are after being dried and pulverized yellow to orange powders soluble in pyridin and in concentrated sulfuric acid with a yellow coloration, yielding vats with hydrosulfite and caustic soda lye which vats dye cotton generally yellow shades.

In order to illustrate the new process more fully the following example is given, the parts being by weight:—To a solution of 1 part of the product obtained by combination of 1-oxy-2.4-diaminoanthraquinone with benzaldehyde in 10 parts of nitrobenzene, 1 part of benzoyl chlorid is added and the mixture is heated to 150° C. When the reaction is finished the mixture is cooled and the separated dyestuff which is the 4-benzoylamino-μ-phenyl-1.2-anthraquinone-oxazol is filtered off and dried. The new vat dyestuff crystallizes in yellow needles from nitrobenzene which are soluble in concentrated sulfuric acid with a yellow coloration and yield a red vat with hydrosulfite and NaOH from which cotton is dyed in a yellow shade distinguished by its fastness to light, washing and ironing. The new dyestuff thus obtained has probably the formula:

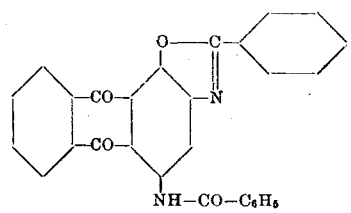

I claim:—

1. The herein described new vat dyestuffs having most probably the formula:

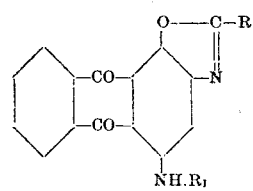

R meaning a substituent and $R_1$ meaning acidyl which are yellow to orange powders soluble in concentrated sulfuric acid with a yellow color; yielding vats, which dye cotton yellow shades, on saponification they furnish the intermediate products from which they were produced by acetylization, substantially as described.

2. The herein described new vat dyestuffs having most probably the formula:

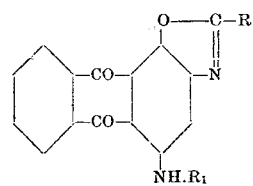

R meaning an aryl substituent and $R_1$ meaning acidyl, which are yellow to orange powders soluble in concentrated sulfuric acid with a yellow color; yielding vats, which dye cotton yellow shades, on saponification they furnish the intermediate products from which they were produced by acetylization, substantially as described.

3. The herein described new vat dyestuffs having most probably the formula:

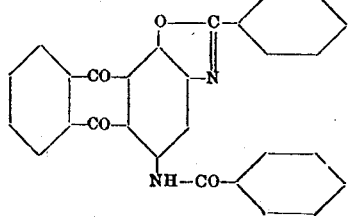

which may be obtained in yellow needles dissolving with a yellow coloration in concentrated sulfuric acid, yielding a vat with hydrosulfite and caustic soda lye which dyes cotton in a yellow shade distinguished by its fastness to light, washing and ironing, substantially as described.

In testimony whereof I have hereunto set my hand in the presence of two subscribing witnesses.

HERMANN FRIEDMANN. [L. S.]

Witnesses:
 HELEN NUFER,
 A. NUFER.

Copies of this patent may be obtained for five cents each, by addressing the "Commissioner of Patents, Washington, D. C."